United States Patent
Abou-chakra et al.

(10) Patent No.: US 7,483,523 B2
(45) Date of Patent: Jan. 27, 2009

(54) TIME DELAY COMPENSATION DEVICE FOR THE MANAGEMENT OF MULTIMEDIA COMMUNICATIONS VIA AN ASYNCHRONOUS NETWORK AND A TELEPHONE NETWORK

(75) Inventors: Rabih Abou-chakra, Cormeilles en Parisis (FR); Abdelkrim Moulehiawy, Paris (FR)

(73) Assignee: Alcatel, Paris (FR)

(*) Notice: Subject to any disclaimer, the term of this patent is extended or adjusted under 35 U.S.C. 154(b) by 330 days.

(21) Appl. No.: 10/546,814

(22) PCT Filed: Feb. 25, 2004

(86) PCT No.: PCT/FR2004/000401

§ 371 (c)(1),
(2), (4) Date: Feb. 23, 2006

(87) PCT Pub. No.: WO2004/077717

PCT Pub. Date: Sep. 10, 2004

(65) Prior Publication Data

US 2006/0193454 A1 Aug. 31, 2006

(30) Foreign Application Priority Data

Feb. 25, 2003 (FR) .................................. 03 02265

(51) Int. Cl.
*H04M 11/00* (2006.01)
(52) U.S. Cl. .................... 379/90.01; 348/14.01
(58) Field of Classification Search ................. 370/382; 379/93.09, 93.11, 93.14, 93.15, 202.01, 208.01, 379/206.01; 348/14.01
See application file for complete search history.

(56) References Cited

U.S. PATENT DOCUMENTS

| 6,104,706 A | 8/2000 | Richter |
| 6,167,043 A | 12/2000 | Frantz |
| 6,288,753 B1 * | 9/2001 | DeNicola et al. ............. 348/586 |
| 6,690,407 B1 * | 2/2004 | Parker et al. ............. 348/14.01 |
| 7,319,477 B2 * | 1/2008 | Katz ....................... 348/14.01 |
| 2003/0008682 A1 * | 1/2003 | Emerson, III ............... 455/557 |

FOREIGN PATENT DOCUMENTS

WO  WO 99/44363 A  9/1999

* cited by examiner

*Primary Examiner*—Quoc D Tran
*Assistant Examiner*—Maria El-Zoobi
(74) *Attorney, Agent, or Firm*—Sughrue Mion, PLLC

(57) ABSTRACT

A device is dedicated to managing multimedia communications via an asynchronous network (IPN) and a telephone network (TDMN) between firstly a first audio communications terminal (T1) with a first video communications terminal (PC1), and secondly a second audio communications terminal (T2) with a second video communications terminal (PC2). The device comprises management means (MG) serving to order link means (ML) to set up a telephone link (L1) between the audio communications terminals (T1, T2) via the traditional telephone network (TDMN) on receiving a request to set up a multimedia call between the first and second video communications terminals (PC1, PC2) via the asynchronous network (IPN).

18 Claims, 2 Drawing Sheets

Figure 1:
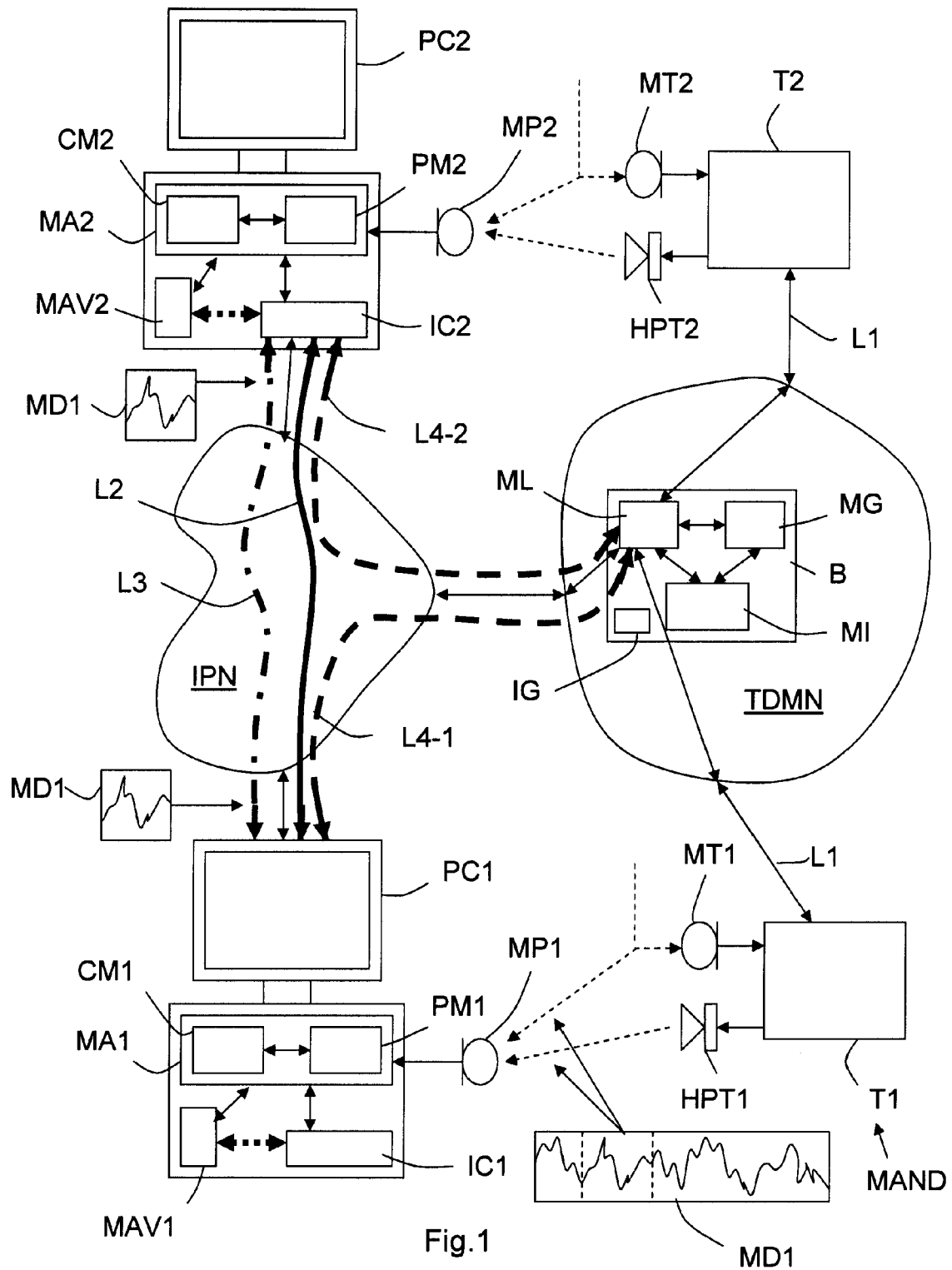

TIME DELAY COMPENSATION DEVICE FOR THE MANAGEMENT OF MULTIMEDIA COMMUNICATIONS VIA AN ASYNCHRONOUS NETWORK AND A TELEPHONE NETWORK

The invention relates to the field of multimedia communications, in particular within asynchronous networks.

The term "multimedia" is used herein to mean not only audio (voice and sound) and video (still or moving images), but also "instantaneous" messaging, or indeed presenting or sharing one or more documents, and the like.

In multimedia communications, the sound (or audio) portion is often of great importance. Unfortunately, transmitting a stream of audio (or voice) data packets within asynchronous networks, for example networks using the Internet protocol (IP), leads to a perceptible degradation of the initial sound quality. This results mainly from jitter (i.e. fluctuations) in transmission times, loss of packets, line echoes, and acoustic echoes.

To remedy that drawback, proposals have been made to set up a first multimedia call via an asynchronous network, and to set up manually in parallel therewith a second call dedicated to audio and passing via a traditional switched telephone network. Under such circumstances, the first call is set up between at least two multimedia (or video) communications terminals having their loudspeakers and microphones initially switched off, and the second call is set up between at least two audio communications terminals.

The term "audio communications terminal" (or audio terminal) is used herein to designate any communicating network equipment capable of exchanging audio data, such as a telephone, for example. Similarly, the term "multimedia (or video) communications terminal" (or video terminal) is used herein to designate any multimedia communicating network equipment capable of exchanging video data, for example a personal computer.

Such a solution leads to loss of synchronization between the audio data and the video data packets reaching the audio and video terminals of a given user. More precisely, the audio data generally arrives earlier than the video packets because the audio data is transmitted within a traditional telephone network in quasi-instantaneous manner, whereas the transmission times of video data packets within asynchronous networks are longer and of the "non-deterministic" type. The term "non-deterministic" is used herein to designate presenting a characteristic that is variable and not controllable over time (or random). Document WO 99/44363 describes a method and a gateway for resynchronizing audio data and video data packets reaching the audio and video terminals of a given user, the audio signal and possibly also the video signal being transmitted via an asynchronous network such as a computer local network. The gateway has means for applying a transmission delay to the audio data which is variable and adjusted so as to compensate at least in part for a difference between the transmission times of the audio data and of the video data.

The gateway must have parameter values available for each terminal that is to use its services: a name or an identifier of the terminal; the type of the terminal; the identifier of another terminal if the terminal in question is associated with another terminal to form a multimedia combination; a type of network to which the terminal is connected; an address for the terminal in a computer network; the standards supported by the terminal; and calibration information. Document WO 99/44363 states that those parameter values are supplied either by an operator capable of accessing the gateway, or by the user of a terminal, by means of an on-line access.

It is frequent for a user to begin by setting up a multimedia (video and audio) call via an asynchronous network and then feel the need to establish a audio call via a traditional telephone network; this happens particularly if the user finds that the quality of audio transmission over the asynchronous network is not sufficient. The user must then quickly obtain the telephone number of the telephone terminal to be called, by contacting the other party via conventional or instantaneous electronic messaging; or by searching manually through a directory. The user must then dial the number on the keypad of a conventional telephone terminal. Setting up the audio call via a network that is different from the network used for the initial multimedia call is therefore not very practical for the user insofar as the user must set up a call twiceover: firstly setting up the multimedia call, and subsequently setting up a telephone call.

The invention thus seeks to remedy the above-mentioned drawback.

To this end, the invention provides a device for managing multimedia calls both via an asynchronous network and via a traditional telephone network between firstly a first audio communications terminal associated with a first video communications terminal, and secondly a second audio communications terminal associated with a second video communications terminal; these video communications terminals being suitable for requesting a multimedia call capable of transmitting at least one video signal to be set up over the asynchronous network;

the device being characterized in that it comprises:

link means suitable for being ordered to set up a telephone link between said first and second audio communications terminals via said traditional telephone network; and means suitable for automatically supplying the link means with the identifiers of the first and second audio communications terminals when a multimedia link is to be set up between the first and second video communications terminals via the asynchronous network.

The device as characterized in this way makes it easy for a user to set up a telephone call via a traditional telephone network in parallel with a multimedia call used solely for transmitting video, since the means suitable for automatically supplying the identifiers of the first and second audio communications terminals to the link means spare the user from any need to look for the identifier of the audio terminal to be called, and any need to set up a call on the basis of the identifier.

In a first embodiment, the means suitable for automatically supplying the identifiers of the first and second audio communications terminals to the link means comprise, in each video communications terminal:

means for sending to the other video communications terminal an identifier of the telephone terminal associated with the video terminal in question;

means for receiving from the other video communications terminal an identifier of the telephone terminal associated with said other video terminal; and means for instructing the link means to set up a telephone link between the two terminals as identified in this way.

In a second embodiment, the said means suitable for automatically supplying the link means with the identifiers of the first and second audio communications terminals comprise, in a node of the traditional telephone network:

means for searching for the identifiers of the first and second audio communications terminals in a centralized directory; and means for instructing the link means to set up a telephone link between the two terminals as identified in this way.

Several embodiments can be envisaged for the management means. They can be arranged in such a manner as to apply a transmission delay to the audio data that is of (optionally constant) predetermined duration, or that is of variable duration.

With duration that is variable, several circumstances can be envisaged. For example, the management means may be arranged in such a manner as to determine the duration as a function of audio data delivered thereto either by the management interface means of the device, or by the first and second video terminals after the link means have established so-called signaling links with said video terminals via the asynchronous network.

Under such circumstances, at least two embodiments can be envisaged. Both rely on using the microphone of each video terminal to pick up sound (audio data) delivered by the user to the audio terminal or delivered by the loudspeaker of the audio terminal.

In the first embodiment, the device has auxiliary modules each coupled to a microphone within a video terminal and serving to determine the transmission time difference for audio data over the multimedia link and over the telephone link, and to generate auxiliary data representative of this difference.

For this purpose, each auxiliary module may, for example, comprise:

processor means serving, on receiving audio data (sound picked up by the microphone of the video terminal), to extract therefrom a portion, then to constitute a primary packet with the audio data of the portion, then to synchronize the primary packet with the exchanged video stream, and finally to transmit the synchronized primary packet to the auxiliary module implanted in the video terminal with which their own video terminal has set up a multimedia link; and calculation means serving, on receiving a primary packet, to date and time stamp the primary packet, then to compare the audio data portion contained in said stamped primary packet with the stamped telephone audio data previously received via the audio terminal of the microphone, then in the event of identity between the portion and some of the telephone audio data, to determine the difference in transmission duration for audio data over the multimedia link and over the telephone link, then to generate auxiliary data representative of said difference, and finally to transmit the auxiliary data to the link module via a signaling link.

Under such circumstances, firstly the processor means can be arranged, on receiving the audio data and prior to transmitting the primary packet, in such a manner as to constitute a trigger secondary packet and to synchronize it with the exchanged video stream, then to transit said secondary packet to the calculation module implanted in the video terminal with which their own video terminal has established a multimedia link, and secondly, the calculation means are arranged, on receiving a secondary packet, in such a manner as to instruct storage and date and time stamping of the telephone audio data coming from the audio terminal via the microphone.

In the second embodiment, firstly the management means are arranged, after setting up the telephone links, to transmit simultaneously to the first and second video terminals via the telephone link and their respective microphones a message that defines an initial instant, and secondly the device includes auxiliary modules each coupled to a microphone within a video terminal and serving to determine the duration of video data transmission over the multimedia link, and to generate auxiliary data representative of said duration.

For this purpose, each auxiliary module may, for example, comprise:

date and time stamping means arranged firstly, on receiving a message, to trigger a time counter and to add a send time mark representative of the duration that has elapsed since the time counter was triggered to each video packet stream that is to be transmitted to the video terminal with which their own video terminal has set up a multimedia link, and secondly, on receiving a stream of marked video packets, for adding to said stream a receive time mark representative of the duration that has elapsed since the time counter was triggered; and calculation means arranged to respond to the send and receive time marks to determine the duration of video data transmission over the multimedia link established via the asynchronous network between the first and second video terminals, then to generate auxiliary data representative of said transmission duration, and to transmit the auxiliary data to the link module via a signaling link.

Under such circumstances, firstly the management means are preferably arranged so as to determine the real duration of video data transmission over the multimedia link by adding together the received transmission duration and the result of taking the difference between a first message transmission duration between the management means and the auxiliary module implanted in the second video terminal, and a second message transmission duration between the management means and the auxiliary module implanted in the first video terminal. These first and second durations may be obtained, for example, by implementing an acoustic echo technique, preferably implemented by the management means.

Figure 2:
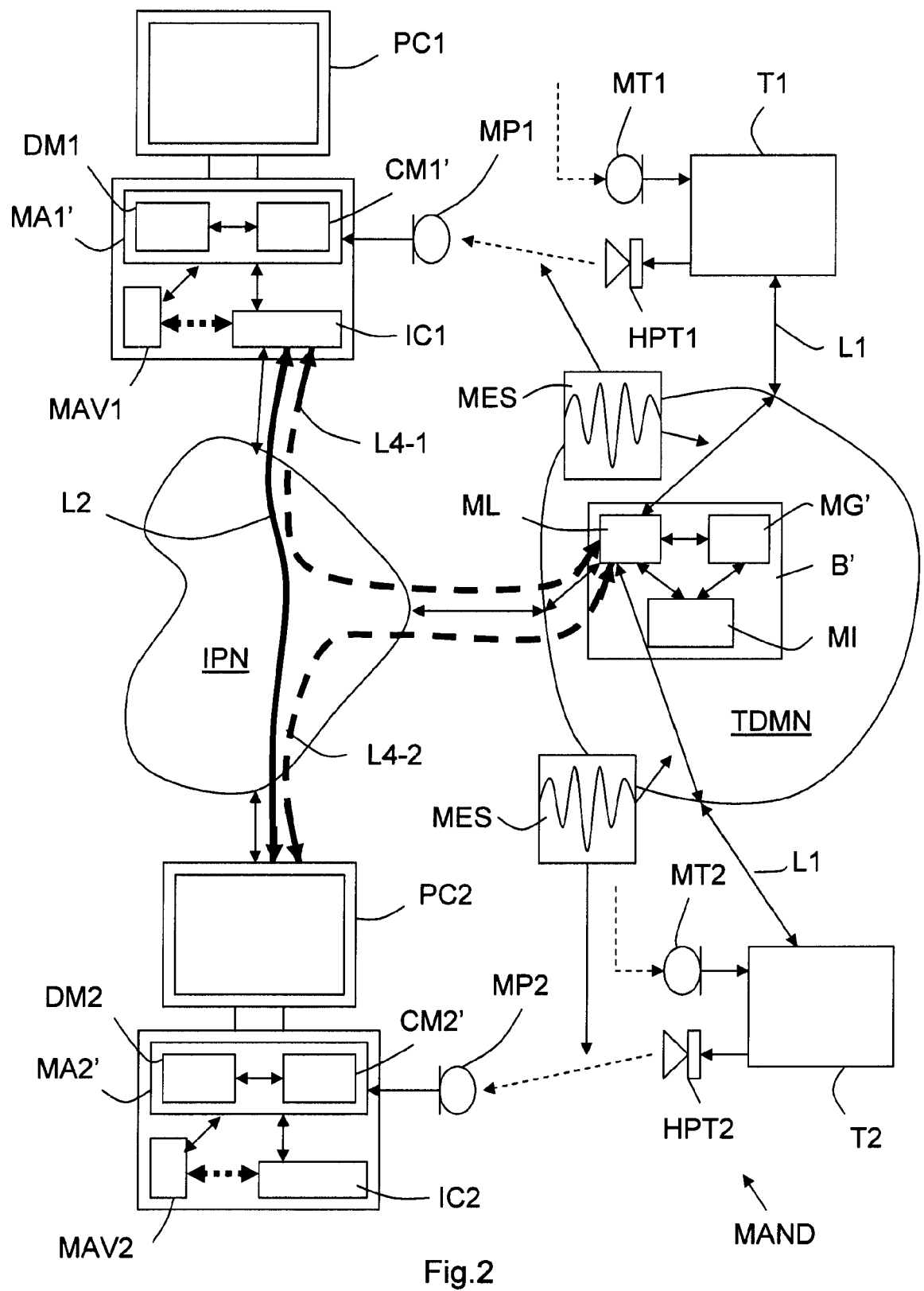

Other characteristics and advantages of the invention appear on examining the following detailed description and the accompanying drawings, in which:

FIG. 1 is a diagram of a first embodiment of a device of the invention implanted in a communications installation; and FIG. 2 is a diagram of a second embodiment of a device of the invention implanted in a communications installation.

The accompanying drawings serve not only to add to the description of the invention, but may also contribute to defining it, where appropriate.

The invention relates to multimedia communications within asynchronous networks and traditional telephone networks between firstly a first audio communications terminal with a first video communications terminal that are independent of each other, and secondly a second audio communications terminal with a second video communications terminal that are independent of each other.

Below, it is assumed by way of example that the asynchronous network is an IP network and that the telephone network is of the time division multiplexed (TDM) type. However the invention is not limited to IP asynchronous networks nor is it limited to TDM telephone networks. It relates to any so-called "packet switching" asynchronous network in which a stream of audio or video data packets is transmitted in non-deterministic (or random) manner, and it also relates to any traditional switched telephone network in which transmission times are short and predictable.

Furthermore, below it is considered by way of example that each audio communications terminal is a fixed telephone having a loudspeaker and a microphone and connected by wire to the TDM telephone network. Furthermore, below, it is assumed by way of example that each video communications terminal is a multimedia personal computer fitted with a loudspeaker and a microphone, capable of exchanging video data over the asynchronous IP network, and possibly coupled to a video camera. However, the invention is not limited to personal computers (desktop or portable). It relates to any communicating equipment capable of exchanging multimedia data (and in particular video data) via the asynchronous IP network.

Consequently, the terms "telephone" and "computer" as used below designate respectively an audio communications terminal (or audio terminal) and an IP video communications terminal (or IP video terminal).

The invention proposes a management device for enabling users to exchange audio (or voice) data and video (or image) data in synchronized manner respectively via their telephones and their personal computers (which are mutually independent).

Reference is made to FIG. 1 while describing a first embodiment of the management device of the invention.

In this embodiment, a first user has a first pair of equipments comprising a first telephone T1 and a first computer PC1 containing video data (or connected to a video-camera delivering video data, such as a "webcam", for example). Similarly, a second user has a second pair of equipments comprising a second telephone T2 and a second computer PC2 containing video data (or connected to a video camera delivering video data, such as a "webcam", for example).

Each computer PCi (in this case i=1 or 2) has a loudspeaker (not shown), a microphone MPi, and a video application module MAVi coupled to an IP communications interface ICi so as to feed it with video data stored in a memory or coming from a video camera, the interface ICi being connected to an IP network IPN. Furthermore, each telephone Ti has a loudspeaker HPTi and a microphone MTi, and is connected to a traditional telephone network TDMN with synchronous time multiplexing.

The traditional telephone network TDMN includes a management unit B, for example implanted in a private branch exchange (PBX), and a portion of the management device MAND of the invention can be implanted therein. More precisely, the management unit B comprises at least a link module ML and a management module MG. The link module ML serves to set up a telephone link between a telephone T1 and a telephone T2 via the telephone network TDMN under the control of the management module MG.

The management module MG receives an order to set up an audio call L1 when a multimedia link L2-L3 is to be set up between two video communications terminal PC1, PC2 via the asynchronous network IPN. The module MG then orders the link module ML to set up a telephone link L1 between the telephone T1 and T2 via the traditional network TDMN; and secondly, it determines a transmission delay to be applied to the audio data exchanged via the telephone link L1 in order to compensate at least in part for the difference in the duration of transmission between the audio data to be exchanged by the telephones T1 and T2 via the telephone link L1, and the video data to be exchanged by the computers PC1 and PC2 via a multimedia link L2-L3 set up within the network IPN. The multimedia link in fact comprises two links: a link L2 for transmitting a video signal and a link L3 intended to transmit an audio signal. The assumption is that the quality of the link L3 is not satisfactory for the users. They would rather use an audio link L1 via the traditional network TDMN.

Although not shown, the management unit B can also include an echo canceller module of the type used conventionally when an audio delay greater than some selected threshold value needs to be introduced. The threshold value is generally selected as a function of a recommendation. For example it is equal to 10 milliseconds (ms) or 20 ms.

In the example shown, the management unit B also has an insertion module MI fed with audio data to be delayed (coming from a telephone T1) by the link module ML, and serving to apply a transmission delay to the audio data, which delay is determined by the management module MG. Once the delay has been applied, the audio data returns to the link module ML which transmits it via the link L1 to the destination telephone Tj. The insertion module MI may form part of the management module MG, however it could equally well be implanted somewhere other than in the management unit B.

Naturally, in order to enable the telephone link L1 to establish an association with the video link L2 in the multimedia link L2-L3, it is necessary for both computers PC1 and PC2 to have been configured for this purpose, and more precisely for their multimedia communications application modules MAVi to have been configured. Configuration consists specifically in providing the multimedia communications application module MAVi of the computer PCi with the full telephone identifier (including regional and national codes) of the telephone Ti associated therewith.

Thus, when a user Ui possesses both a computer PCi and a telephone Ti and desires to set up a multimedia call with a user Uj possessing both a computer PCj and a telephone Tj, the first user activates the multimedia communications application module MAVi of the computer PCi specifying the IP identifier of the computer PCj. The application module MAVi can operate in two different ways when a user Ui thus requests it to set up a multimedia call:

either the module MAVi is programmed always to set up two calls whenever a user Ui requests a multimedia call to be set up, i.e. both: a multimedia call L2-L3 capable a priori of conveying both a video signal and an audio signal, but which in fact is used only for conveying a video signal to the multimedia terminal constituted by the computer PCj via the asynchronous network IPN; and a telephone call L1 to the telephone terminal Tj associated with the computer PCj of the corresponding user Uj via the traditional network TDMN;

or else the module MAVi is programmed to set up only the multimedia call L2-L3, and to give the user Ui as an option the possibility of also setting up a telephone call L1 (of better quality) to the telephone terminal Tj associated with the computer PCj of the corresponding user Uj, via the traditional network TDMN. If the user Ui gives a positive response, then the application module MAVi will read from a memory of the computer PCi the identifier of the telephone terminal Tj associated with the multimedia terminal constituted by the computer PCj of the corresponding user Uj, where this identifier has already been stored in the memory.

The two multimedia communications application modules MAVi and MAVj of the computers PCi and PCj negotiate a multimedia link L2-L3, and they set up this multimedia link L2-L3 via the network IPN.

In a first embodiment of the management unit B and of the video application modules MAVi and MAVj, the modules inform each other of the telephone identifiers of the telephones Ti and Tj with which they are respectively associated. The two users therefore do not need to intervene in order to obtain the telephone number of the other party. Once the multimedia link L2-L3 has been set up, the computer PCi sends a request to the management unit B (of known IP identifier), requesting it to set up the telephone link, said request containing in particular the telephone identifiers of both telephones Ti and Tj. The management module MG processes the request and orders the link module ML to set up the telephone link L1. The multimedia call via the video terminals PCi and PCj (for the images) and via the audio terminals Ti and Tj (for voice) can then begin. The setting up of the telephone link L1 is made possible by the fact that the switching center has the ability to set up special routing to a management unit B by using dedicated call prefixes and a protocol such as CSTA.

The procedure for setting up the telephone call L1 in addition to the multimedia call L2-L3 can thus either be launched always, e.g. by configuring the multimedia communications application module MAVi for this purpose; or else it can be launched at the request of the user Ui, e.g. by selecting an option made available on the computer screen by the multimedia communications application module MAVi. Either way, the procedure is simplified since the user has no need to obtain the identifier of the other party's telephone.

In a second embodiment (not shown) of the management unit B and of the video application modules MAVi and MAVj, more particularly adapted to business networks, the telephone identifiers of the terminals Ti and Tj are stored in a directory server, and an application is run on an application server, these servers being situated at nodes of the business network. At the request of a video communications terminal, e.g. PC1, the application sets up a multimedia call L2-L3 via the asynchronous network IPN, and optionally also sets up a telephone call L1 via the traditional network TDMN in a manner that is entirely automatic. There are two variant ways in which this application can operate:

either the application is programmed always to set up two calls when a user Ui requests that a multimedia call be set up, i.e. both: a multimedia call L2-L3 capable a priori of conveying both a video signal and an audio signal, but which is used only for conveying a video signal to the multimedia terminal constituted by the computer PCj via the asynchronous network IPN; and a telephone call L1 to the telephone terminal Tj associated with the computer PCj of the corresponding user Uj, via the traditional network TDMN;

or else it is programmed to set up only a multimedia call L2-L3 that is capable a priori of conveying both a video signal and an audio signal via the asynchronous network IPN, and to give the user the option of also causing a telephone call L1 (of better quality) to be set up to the telephone terminal associated with the other party's multimedia terminal, via the traditional network TDMN.

Either way, the procedure of setting up the telephone call is automated, and the user has no need to find the telephone number that is to be called. The application is programmed to go and find the identifier of the telephone terminal associated with the other party's multimedia terminal automatically from the directory server associated with the switching center.

The transmission delay applied to the audio data may be of predetermined duration (possibly constant). However it is preferable for it to be of variable duration so as to optimize synchronization between audio data and video data.

When the delay is of variable duration, at least three circumstances can be envisaged. For example the management module MG may determine the duration of the delay as a function of auxiliary data delivered thereto by an operator via the management interface IG of the device, or else by the user Ui of one of the computers PCi via a so-called signaling link L4-i, for example, or indeed by the computers PC1 and PC2 after the link module ML has set up signaling links L4-i therewith via the network IPN.

The example of the management device shown in FIG. 1 serves to determine and apply a variable delay on the basis of auxiliary data supplied by the computer PC1 or the computer PC2. For this purpose, the management device has auxiliary modules (or calculation devices) MAi implanted in each computer PCi and coupled to the IP communications interface ICi. Each auxiliary module MAi is coupled to the microphone MPi of the computer PCi in which it is implanted, and in this example it serves to determine (or to estimate) the difference between the duration of transmission for audio data over the video multimedia link L2 and over the telephone link L1, and to generate auxiliary data representative of this difference.

As shown in FIG. 1, each auxiliary module MAi (e.g. MA1) comprises a processor module PMi (e.g. PM1) which, on receiving from the microphone Mi (M1 in this example) audio data representative of speech (or sound signals) SS1 uttered by the user U1 into the microphone MT1 of the telephone T1, serves to extract therefrom a portion PSS1, then to constitute a primary packet with the audio data of the multimedia PSS1, then to synchronize the primary packet with the video stream exchanged over the video multimedia link L2, and finally to transmit the synchronized primary packet to the auxiliary module MA2 implanted in the computer PC2. Since this primary packet contains audio data, it travels via the audio portion L3 of the multimedia link set up between the two computers PC1 and PC2 within the IP network IPN.

Furthermore, each auxiliary module MAi (e.g. MA2) includes a calculation module CMi (e.g. CM2) serving to apply a date and time stamp to each primary packet it receives, then to compare the portion PSS1 of the audio data contained in said stamped primary packet with the stamped telephone audio data SS1 previously received by the telephone T1 via the telephone link L1 as issued via its loudspeaker HPT2 and picked up by the microphone MP2, then if the received portion PSS1 and some of the picked-up telephone audio data SS1 are identical, to determine the difference in the duration of transmission of audio data MD1 over the audio multimedia link L3 and over the telephone link L1, then to generate auxiliary data representative of said difference, and finally to transmit the auxiliary data to the link module ML of the management unit B via a signaling link L4-2 that it has previously established with the computer PC2.

In this embodiment, the request to set up the link received by the management unit MG also includes the IP identifiers of both computers PC1 and PC2. Consequently, once the link module ML has set up the telephone link L1, the management module MG orders it to establish a signaling link L4-i with each of the computers PCi over the IP network IPN in order to enable said computers PCi to transmit their auxiliary data thereto.

In this embodiment, it is thus the auxiliary module MAj of the receiving computer PCj that serves to determine the difference in transmission duration between the audio data PSSi coming from the computer PCi over the audio multimedia link L3 and the audio data SSi coming from the telephone Ti over the telephone link L1, with the audio packets being synchronized with the corresponding video packets by any synchronization method known to the person skilled in the art.

On receiving the portion PSS1, the calculation module CMj compares this audio data with the data it has just stored and stamped. Thereafter, when the data is identical, it takes the difference between the arrival time of the audio data of the multimedia PSSi coming from the computer PCi and the arrival time of the audio data SSi coming from the telephone Ti. It is assumed herein that the duration that elapses between the instant at which the sound SSi was uttered by the user Ui and the instant said sound is processed by the processor module PMi is substantially equal to the duration that elapses between the instant the sound SSi is output by the loudspeaker HPTj and the instant at which said sound was given a date and time stamp by the calculation module CMj, prior to being stored in a memory of the auxiliary module MAj (not shown).

The storage mechanism can be implemented in two ways. A first consists in configuring the calculation modules CMi so that they continuously save all of the (sampled) audio data SSj coming from the sending telephone Tj for some selected duration (e.g. equal to a few seconds).

A second way consists in making provision to trigger storage by sending a trigger signal from the sending computer PCj to the receiving computer PCi. To do this, the processor module PMj is arranged in such a manner as to make up a secondary packet (forming a trigger signal) each time it begins to receive audio data SSj picked up by the microphone MPj, and before transmitting the primary packet. Then, the processor module PMj synchronizes the secondary packet with the exchanged video stream, and transmits it via the audio multimedia link L3 to the auxiliary module MAj implanted in the receiving computer PCi.

The calculation module CMi is then arranged to order storage and stamping of the telephony audio data SSj coming from the sending telephone Tj each time it receives a secondary packet coming from the sending computer PCj. This storage preferably takes place over a selected duration (e.g. equal to a few seconds).

Once in the possession of auxiliary data, the management module MG can deduce therefrom the duration of the delay to be applied to the audio data in order to compensate (at least in part) for the lack of synchronization between said audio data as transmitted over the telephone network TDMN, and the packets of video data as transmitted over the IP network IPN. It then sends instructions to the insertion module MI to delay the audio data by the selected duration prior to reinjecting it into the telephone network TDMN to go to the receiving telephone.

It is important to observe that the delay can either be determined for the entire duration of the multimedia call, or else can be determined periodically, e.g. every second.

Reference is now made to FIG. 2 while describing a second embodiment of the management device of the invention. This embodiment presents numerous similarities with the embodiment described above with reference to FIG. 1. In particular, it can be used in the same type of communications installation.

This embodiment differs from the above embodiment firstly in the arrangement of the management module MG' and the auxiliary modules MAi' (or calculation devices), and secondly in the way in which the duration of the delay to be applied to the audio data is determined.

In this embodiment, the management module MG' is arranged, once the telephone link L1 has been set up, to transmit a message MES defining an initial instant simultaneously to the first and second computers PC1 and PC2 via the telephone link L1, via the loudspeakers HPT1 and HPT2 of the telephones T1 and T2, and via their respective microphones MP1 and MP2. Furthermore, each auxiliary module MAi' is still coupled to the microphone MPi of the computer PCi in which it is implanted, but it now serves to determine the transmission duration DT of video data over the video multimedia link L2 and to generate auxiliary data representative of this duration. It is important to observe that the message MES may optionally be sent periodically, in order to enable the initial instant to be redefined periodically.

As shown in FIG. 2, each auxiliary module MAi' includes a date and time stamp module DMi serving, on receiving from the microphone MPi a message MES coming from the management unit B' and output by the loudspeaker HPTi, to trigger a time counter (not shown) and to stamp each video packet stream to be transmitted to the destination computer PCj via the video multimedia link L2. This stamping consists in adding a "send" time mark to the video stream representative of the duration that has elapsed since the time counter was triggered.

The stamping module DMi is also arranged, on receiving a marked (or stamped) stream of video packets coming from a computer PCj via the video multimedia link L2, to add to said stream another "receive" time mark, representative of the duration that has elapsed since its own time counter was triggered.

Each auxiliary module MAi' also has a calculation module CMi' for responding to the send and receive time marks of the video streams received from the sending counter PCj to determine the transmission duration DT of the video data over the video multimedia link L2, and then to generate auxiliary data representative of said transmission duration DT, and to transmit said data to the management module MG' of the management unit B' via the signaling link L4-i previously set up by the link module ML, as explained above.

This is done merely by taking the difference between the receive time mark and the send time mark added to each video stream.

This transmission duration DT is not equal to the true transmission duration DTR since it does not take account of the different transmission durations of the messages MES firstly between the management module MG' and the first computer PC1, and secondly between the management module MG' and the second computer PC2. Because of this difference, the time counts are generally not triggered simultaneously by the date and time stamping modules DM1 and DM2.

The example below serves to illustrate this difference. Assume firstly that the stamping module DM1 of the first computer PC1 receives the message MES at an instant $$T0+A=14 \text{ h } 50 \text{ min } 24 \text{ s } 300 \text{ ms}$$

where A represents the transmission duration of the message MES between the management module MG' and the first computer PC1, and secondly that the stamping module DM2 of the second computer PC2 receives the message MES at an instant $$T0+B=16 \text{ h } 51 \text{ min } 25 \text{ s } 250 \text{ ms}$$

where B represents the transmission duration of the message MES between the management module MG' and the second computer PC2 (in this example there is a time difference of two hours between the two computers).

T0+A thus constitutes the instant at which time counting is started by the stamping receptacle DM1 and T0+B constitutes the instant at which time counting is started by the stamping module DM2.

A video packet sent by the first computer PC1 at 14 h 55 min 49 s 700 ms will therefore have a send time mark with the value 00 h 05 min 25 s 400 ms. This marked video packet is received by the stamping module DM2 of the second computer PC2, for example, at 16 h 56 min 50 s 950 ms, such that said stamping module DM2 can add a receive time mark thereto with the value 00 h 05 min 25 s 700 ms.

To determine the transmission duration DT over the video multimedia link L2, the calculation module CM2' thus performs the following operation:

$$DT = 00\text{ h }05\text{ min }25\text{ s }700\text{ ms} - 00\text{ h }05\text{ min }25\text{ s }400\text{ ms} = 300\text{ ms}$$

The real transmission duration DTR is preferably determined by the management module MG' from the transmission duration DT transmitted in the form of auxiliary data by the auxiliary module MAi' of the receiving computer PCi over the signaling link L4-i.

More precisely, in order to determine the real transmission duration DTR of the video data over the video multimedia link L2, the management module MG' adds to the received transmission duration the result of, taking the difference between the transmission duration of message (B) between the management unit B' and the auxiliary module MA2' implanted in the second computer PC2 and the transmission duration of the message (A) between the management unit B' and the auxiliary module MA1' implanted in the first computer PC1. In other words we have $$DTR = DT + B - A.$$

These durations A and B are constant and can be obtained, for example, by implementing an acoustic echo technique by sending a sound signal from the management unit B' to each of the telephones Ti and back again at the initiative of the management module MG'.

These durations A and B are generally small compared with the transmission durations of video packets over the video multimedia link L2, typically being 25 ms as compared with 300 ms, so it is possible to envisage a simplified mode of operation in which DT is taken to be equal to DTR. Under such circumstances, the management module MG' has no need to perform additional calculation to determine the delay for application to the audio data.

The management, link, insertion, processor, calculation, and stamping modules of the management device and the calculation device of the invention can be implemented in the form of electronic circuits, software (or computer) modules, or a combination of circuits and software.

The invention makes it possible firstly for the audio data of a multimedia call to be transmitted while eliminating fluctuations in transmission times, losses of audio packets, line echoes, and acoustic echoes, and secondly to insert a transmission delay serving to compensate partially or completely for the lack of synchronization between the audio data and the video data packets.

The invention is not restricted to the embodiments of the management device, the calculation device, the video communications terminal, and the management unit described above, purely by way of example, but covers any variant that can be envisaged by the person skilled in the art within the ambit of the claims below.

Thus, embodiments are described above that are adapted to making calls via an asynchronous IP network and a telephone network of the TDM type. However the invention is not limited to those networks only. More generally, it relates firstly to any so-called "packet switched" network in which the transmission of streams of audio or video data packets is of the non-deterministic type, and secondly any traditional telephone network, i.e. switched networks with short transmission times that are of deterministic type.

The invention claimed is:

1. A management apparatus for managing multimedia calls set up at least via one of an asynchronous network or a traditional telephone network between a first video communications terminal associated with a first audio communications terminal and a second video communications terminal associated with a second audio communications terminal, comprising:

management means for receiving a request to set up a telephone link between said first and second audio communications terminals via said traditional telephone network when the first and second video communications terminals request to set up a multimedia link to transmit at least video data via the asynchronous network;

means for automatically providing first and second respective identifiers of the first and second audio communications terminals upon receiving the request to set up the telephone link; and link means for receiving the first and second identifiers and setting up the telephone link via the traditional telephone network.

2. The apparatus according to claim 1, wherein said means for automatically providing the first and second identifiers comprise:

first means for sending to the second video communications terminal the first identifier of the first audio communications terminal and receiving the second identifier of the second audio communications terminal;

second means for sending the second identifier to the first audio communications terminal and receiving from the first video communications terminal the first identifier of the first audio communications terminal; and means for instructing the link means to set up the telephone link between the first and second audio communications terminals, wherein the first and second identifiers are provided by at least one of the first or second communications terminal.

3. The apparatus according to claim 1, wherein said means for automatically providing the first and second identifiers comprise:

means for searching for the first and second identifiers of the first and second audio communications terminals in a centralized directory; and means for instructing the link means to set up the telephone link between the first and second audio communications terminals by using the first and second identifiers located in the centralized directory.

4. The apparatus according to claim 1, wherein said management means is arranged, on receiving the request to set up the telephone link between said first and second audio communications terminals:

to order said link means to set up the telephone link between said first and second audio communications terminals to exchange audio data; and to apply to said audio data exchanged via said telephone link a transmission delay to compensate at least in part for a difference in transmission duration between said audio data exchanged via said telephone link, and the video data exchanged between said first and second video communications terminals via the multimedia link set up via said asynchronous network.

5. The apparatus according to claim 4, wherein said management means is arranged to apply to the audio data the transmission delay of a predetermined duration.

6. The apparatus according to claim 4, wherein said management means is arranged to determine a duration of the transmission delay to be applied to the audio data.

7. The apparatus according to claim 6, wherein said management means is arranged to determine said transmission duration as a function of an auxiliary data.

8. The apparatus according to claim 7, further including: management interface means for delivering said auxiliary data.

9. The apparatus according to claim 7, characterized in that wherein said link means is arranged to establish signaling links with said first and second video communications terminals via said asynchronous network for receiving said auxiliary data sent by said first and second video communications terminals.

10. The apparatus according to claim 9, wherein each video communications terminal includes:
   a microphone which picks up signals representative of audio data delivered by a user of the associated audio communications terminal; and
   auxiliary modules each coupled to a respective microphone of one of said first or second video communications terminal and arranged to determine a difference in the transmission duration of the audio data transmitted over an audio multimedia link set up via the asynchronous network between said first and second video communications terminals and over said telephone link and generate the auxiliary data representative of said difference.

11. A management apparatus for managing multimedia calls set up at least via one of an asynchronous network and a traditional telephone network between a first video communications terminal associated with a first audio communications terminal and a second video communications terminal associated with a second audio communications terminal, comprising;
   management means for receiving a request to set up a telephone link between the first and second audio communications terminals via the traditional telephone network when the first and second video communications terminals request to set up a multimedia link to transmit at least video data via the asynchronous network;
   means for automatically providing first and second respective identifiers of the first and second audio communications terminals upon receiving the request to set up the telephone link; and
   link means for receiving the first and second identifiers, setting up the telephone link via the traditional telephone network between the first and second audio communications terminals to exchange audio data and establishing signaling links with the first and second video communications terminals via the asynchronous network to receive auxiliary data, each video communications terminal comprising;
      a microphone which picks up signals representative of audio data delivered by a user of the associated audio communications terminal, and
      auxiliary modules each coupled to a respective microphone of one of the first or second video communications terminal and arranged to determine a difference in the transmission duration of the audio data transmitted over an audio multimedia link set up via the asynchronous network between the first and second video communications terminals and over the telephone link, each auxiliary module comprising;
      processor means arranged, on receiving said audio data:
         i) to extract a portion therefrom;
         ii) to constitute a primary packet with the audio data of said portion;
         iii) to synchronize said primary packet with the exchanged video stream; and
         iv) to transmit said primary packet to the auxiliary module implanted in the video communications terminal with which their own video communications terminal has set up the multimedia link via said asynchronous network; and calculation means arranged, on receiving the primary packet;
         v) to apply a date and time stamp to said primary packet
         vi) to compare the audio data portion contained in said stamped primary packet to the stamped telephone audio data previously received via said audio communications terminal and said microphone;
         vii) when said portion is identical to some of said telephone audio data, to determine the difference in audio data transmission duration over the multimedia link set up via the asynchronous network between said first and second video communications terminals and over said telephone link
         viii) to generate auxiliary data representative of said difference; and
         ix) to transmit said auxiliary data to said link module via a corresponding signaling link,
      wherein the management means determines the transmission duration as a function of the auxiliary data and applies a transmission delay to the audio data exchanged via the telephone link to compensate at least in part for a difference in the transmission duration between the audio data exchanged via the telephone link and the video data exchanged between the first and second video communications terminals via the multimedia link set up via the asynchronous network.

12. The apparatus according to claim 11, wherein said processor means is arranged, on receiving audio data and before transmitting said primary packet, to;
   make up a secondary packet and to synchronize it with the exchanged audio stream,
   transmit said secondary packet to the calculation module implanted in the video communications terminal with which their own video communications terminal has set up a multimedia link via said asynchronous network, and
   wherein said calculation means is arranged, on receiving the secondary packet, to order storage and date and time stamping of the telephone audio data coming from said audio communications terminal via said microphone.

13. The apparatus according to claim 9, wherein each video communications terminal includes;
   a microphone to pick up signals representative of audio data delivered by a loudspeaker of a respective audio communications terminal ; and
   an auxiliary module coupled to the microphone of the respective first or second video communications terminal, and
   wherein said management means is arranged, after said telephone link has been set up, to transmit simultaneously a message defining an initial instant to said first and second video communications terminals via the telephone link respective loudspeakers and microphones, and
   wherein the auxiliary modules are arranged to determine the transmission duration of video data over the multimedia link based on the received message and generate the auxiliary data representative of said transmission duration of the video data.

14. The apparatus according to claim 13, wherein each auxiliary module comprises:

date and time stamping means for ,on receiving said messages, triggering a time counter of a respective first or second video communications terminal, adding a send time mark representative of a time duration elapsed since said triggering of the respective time counter to each video packet stream to be transmitted from the respective first or second video communications terminal on receiving the marked video packet stream by one of the first or second video communications terminal, adding to said received video packet stream a receive time mark representative of a time duration elapsed since said triggering of the respective time counter; and ii) calculation means arranged to determine the transmission duration of the video data over the multimedia link based on a difference between the send and receive time marks generate the auxiliary data representative of said transmission duration, and transmit said auxiliary data to said link module via a corresponding signaling link.

15. The apparatus according to claim 14, wherein said management means is arranged to determine a real transmission duration of the video data over the multimedia link by adding the determined transmission duration to a difference between a first transmission duration between said management means and the auxiliary module of the second video communications terminal and a second transmission duration between said management means and the auxiliary module of the first video communications terminal.

16. The apparatus according to claim 15, wherein said management means is arranged to determine said first and second transmission durations by an acoustic echo technique.

17. A node for a traditional telephone network, comprising means for receiving a signal indicating that a multimedia link is to be set up between a first video communications terminal and a second video communications terminal via an asynchronous network (IPN);

means for initiating an automatic search of identifiers of first and second audio communications terminals in a centralized directory upon receiving the signal, the first and second audio communications terminals being associated respectively with the first and second video communications terminals; and means for instructing link means to set up a telephone link between the first and second audio communications terminals based on the identifiers located in the centralized directory as identified in this way.

18. The apparatus according to claim 2, wherein the first and second identifiers are included in the request to set up the telephone link.

* * * * *